(12) United States Patent
Suzuki et al.

(10) Patent No.: US 6,594,431 B2
(45) Date of Patent: *Jul. 15, 2003

(54) OPTICAL WAVEGUIDE

(75) Inventors: Katsumi Suzuki, Yokohama (JP); Ikuo Matsukura, Yokohama (JP)

(73) Assignee: Asahi Glass Company Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/235,907

(22) Filed: Sep. 6, 2002

(65) Prior Publication Data

US 2003/0026574 A1 Feb. 6, 2003

Related U.S. Application Data

(63) Continuation of application No. 09/859,466, filed on May 18, 2001, now Pat. No. 6,490,900, which is a continuation of application No. 09/347,000, filed on Jul. 2, 1999, now Pat. No. 6,266,475.

(30) Foreign Application Priority Data

Jul. 3, 1998 (JP) ............................. 10-189311

(51) Int. Cl.$^7$ ............................. G02B 6/10; G02B 6/00
(52) U.S. Cl. ........................ 385/129; 385/142; 385/143; 385/144; 385/145
(58) Field of Search ................................. 385/141–145, 385/129–130

(56) References Cited

U.S. PATENT DOCUMENTS

| 4,804,246 A | 2/1989 | Kobayashi et al. |
| 4,833,207 A | 5/1989 | Kinaga et al. |
| 5,080,508 A | 1/1992 | Onishi et al. |
| 5,116,544 A | 5/1992 | Inukai et al. |
| 5,117,480 A | 5/1992 | Yamamoto et al. |
| 5,155,796 A | 10/1992 | Oonishi et al. |
| 5,223,561 A | 6/1993 | Yamamoto et al. |
| 5,353,368 A | 10/1994 | Resnick |
| 6,166,125 A | 12/2000 | Sugiyama et al. |
| 6,266,475 B1 | 7/2001 | Suzuki et al. |
| 6,490,400 B2 * | 12/2002 | Suzuki et al. ............... 385/145 |

FOREIGN PATENT DOCUMENTS

| EP | 0 357 354 | 3/1990 |
| EP | 0 421 387 | 4/1991 |
| EP | 0 459 132 | 12/1991 |
| EP | 0 488 390 | 6/1992 |
| EP | 0 767 467 | 4/1997 |
| EP | 0 907 088 | 4/1999 |

* cited by examiner

Primary Examiner—Hemang Sanghavi
Assistant Examiner—Omar Rojas
(74) Attorney, Agent, or Firm—Oblon, Spivak, McClelland, Maier & Neustadt, P.C.

(57) ABSTRACT

An optical waveguide provided on a substrate, which comprises a core for transmitting light and a clad formed around the core, wherein the clad is made of a fluorinated alicyclic structure-containing polymer having functional groups.

28 Claims, No Drawings

OPTICAL WAVEGUIDE

This application is a Continuation of prior U.S. application Ser. No. 09/859,466 filed May 18, 2001 now U.S. Pat. No. 6,490,900, which is a Continuation of U.S. Pat. No. 09/347,000 filed on Jul. 2, 1999 now U.S. Pat. No. 6,266,475, granted Jul. 24, 2001.

The present invention relates to an optical waveguide having a clad made of a fluorinated alicyclic structure-containing polymer having functional groups, which has a high adhesion to the substrate, and which has low transmission loss.

It has been known that by using an amorphous fluorine-containing polymer as a material for an optical waveguide, the transmission loss can be made small, the rate of the moisture absorption can be made low, and the light scattering resulting from birefringence can be suppressed (JP-A-4-190202).

However, if the amorphous fluorine-containing polymer is used for the clad of an optical waveguide, the adhesion to the substrate tends to be low. Accordingly, in the case where layers of clad and core are successively formed on a silicon substrate, and the core is processed to have a desired shape to prepare an optical waveguide, for example, the clad made of the amorphous fluorine-containing polymer is likely to peel off from the substrate or the core. Further, in the case where the optical waveguide part is cut out from the substrate after the optical waveguide is formed, the clad is likely to peel off from the substrate. Still further, in the case where the amorphous fluorine-containing polymer is used for the core of the optical waveguide, as the refractive index of the material itself is low, a material having a lower refractive index required for the clad of the optical waveguide is hardly available.

Under these circumstances, it is the object of the present invention to overcome the above-mentioned problems of prior art, and to provide an optical waveguide having improved adhesion between the clad and the substrate, without impairing excellent properties of the amorphous fluorine-containing polymer.

The present invention resides in an optical waveguide provided on a substrate, which comprises a core for transmitting light and a clad formed around the core, wherein the clad is made of a fluorinated alicyclic structure-containing polymer having functional groups.

Now, the present invention will be described in detail with reference to the preferred embodiments.

In the present invention, the optical waveguide is a basic component for an opto-device formed on a semiconducting substrate such as a silica glass substrate or a silicon substrate, and can constitute various passive optical parts.

The optical waveguide has a structure having a core for transmitting light and a clad formed around the core, and includes an optical fiber. For the core for transmitting light, it is necessary to employ a material having a higher refractive index than the material for the clad. The transmitted light is entrapped in the waveguide, and the transmitted light is controlled by a signal from the exterior. It is classified into an optical modulator, an optical switch, a wave selecting device, an optical integrated circuit or the like, depending upon the function.

The optical waveguide usually comprises a clad formed on a substrate, a core formed on the clad, and a clad formed on the core.

As a method to form the clad around the core on the substrate, a clad is formed on the substrate, a core is formed on the clad, a portion of the core is removed by etching, and a clad is formed on the remaining core to obtain a constitution wherein the core is surrounded by the clad.

The polymer having a fluorine-containing alicyclic structure of the present invention (hereinafter sometimes referred to as fluoropolymer) is preferably one obtained by polymerization of a monomer having a fluorine-containing alicyclic structure, or a polymer having a fluorine-containing alicyclic structure in its main chain, obtained by cyclic polymerization of a fluorine-containing monomer having at least two polymerizable double bonds.

"Having a fluorine-containing alicyclic structure in its main chain" means having a structure in which at least one carbon atom constituting the aliphatic cycle is a carbon atom in the carbon chain constituting the main chain, and fluorine atoms or fluorine-containing groups are bonded to at least some of carbon atoms constituting the aliphatic cycle.

The material for the core is not particularly limited so long as it has a higher refractive index than the material for the clad. However, an amorphous fluorine-containing polymer is preferred as the core material, in view of the properties and the adhesion to the clad. The particularly preferred core material is a fluorine-containing alicyclic structure-containing polymer which is the same type as the clad material. As the core material, a crosslinked product of a crosslinking-curable fluorine-containing compound as well as the polymer having a fluorine-containing alicyclic structure which is the same type as the clad material, may be used. For example, by using a perfluoro compound having at least two cyano groups, an amorphous fluorine-containing polymer can be obtained by crosslinking by trimerization of the cyano groups (a reaction to form a s-triazine ring from three cyano groups). By using such a crosslinking-curable fluorine-containing compound, a core made of a crosslinked amorphous fluorine-containing polymer can be formed. As the crosslinked product has an s-triazine ring, it has a high refractive index as compared with a polymer having a fluorine-containing alicyclic structure as mentioned hereinafter, and the refractive index can be changed by controlling the amount of the s-triazine rings.

The particularly preferred core material is the polymer having a fluorine-containing alicyclic structure which is the same type as the clad material, and which is a material wherein the affinity with the clad material is high, and irregularity at the interface between the clad and the core is less likely to form. Now, the present invention will be explained with reference to an example wherein the polymer having a fluorine-containing alicyclic structure which is the same type as the clad material is used as the core material.

The polymer having a fluorine-containing alicyclic structure to be used for the core material may have functional groups, or may not have functional groups. However, one having functional groups is preferred as it is excellent in the adhesion to the clad material. Further, to raise the refractive index of the core material, it is preferred to blend in the polymer having a fluorine-containing alicyclic structure, a substance having a higher refractive index than the polymer.

The polymer having a fluorine-containing alicyclic structure in its main chain, obtained by polymerization of a monomer having a fluorine-containing alicyclic structure, may, for example, be a polymer having a fluorine-containing alicyclic structure in its main chain, obtained by homopolymerization of a monomer having a fluorine-containing alicyclic structure such as perfluoro(2,2-dimethyl-1,3-dioxole), or by copolymerization of the monomer with a radical polymerizable monomer such as tetrafluoroethylene, chlorotrifluoroethylene or perfluoro (methyl vinyl ether) (JP-B-63-18964).

The polymer having a fluorine-containing alicyclic structure in its main chain, obtained by cyclic polymerization of a fluorine-containing monomer having at least two polymerizable double bonds, may, for example, be a polymer having a fluorine-containing alicyclic structure in its main chain, obtained by cyclic polymerization of a monomer such as perfluoro(allyl vinyl ether) or perfluoro(butenyl vinyl ether), or by copolymerization of the monomer with a radical polymerizable monomer such as tetrafluoroethylene, chlorotrifluoroethylene or perfluoro(methyl vinyl ether) (JP-A-63-238111, JP-A-63-238115).

A polymer having a fluorine-containing alicyclic structure in its main chain can be obtained also by copolymerization of a monomer having a fluorine-containing alicyclic structure such as perfluoro(2,2-dimethyl-1,3-dioxole) with a fluorine-containing monomer having at least two polymerizable double bonds such as perfluoro(allyl vinyl ether) or perfluoro(butenyl vinyl ether).

The polymer having a fluorine-containing alicyclic structure has polymer units having a fluorine-containing alicyclic structure in an amount of preferably at least 20 mol %, particularly preferably at least 40 mol %, based on the total polymer units of the polymer having a fluorine-containing alicyclic structure, in view of transparency, mechanical properties and the like. The polymer units having a fluorine-containing alicyclic structure are polymer units formed by polymerization of the above-mentioned monomer having a fluorine-containing alicyclic structure, and polymer units formed by cyclic polymerization of the fluorine-containing monomer having at least two polymerizable double bonds.

A perhalo compound is preferred as the polymer having a fluorine-containing alicyclic structure, since transmission with a lower loss can be made possible. Specific examples of the polymer having a fluorine-containing alicyclic structure which is a perhalo compound, include compounds having polymer units selected from the following formulae (1) to (4). Some of fluorine atoms in the polymer having a fluorine-containing alicyclic structure may be substituted by chlorine atoms to increase the refractive index:

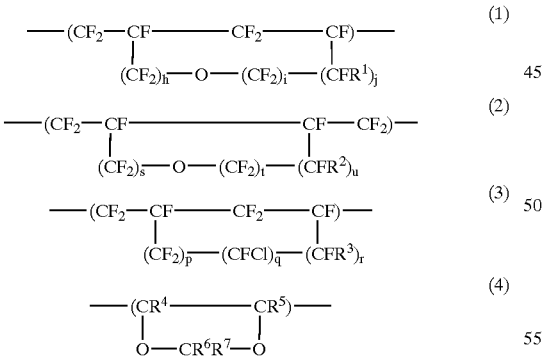

wherein h is an integer of from 0 to 5, i is an integer of from 0 to 4, j is 0 or 1, h+i+j is from 1 to 6, s is an integer of from 0 to 5, t is an integer of from 0 to 4, u is 0 or 1, s+t+u is from 1 to 6, each of p, q and r which are independent of one another, is an integer of from 0 to 5, p+q+r is from 1 to 6, and each of $R^1$ to $R^7$ which are independent of one another, is a fluorine atom, a chlorine atom, a chlorodifluoromethyl group or a trifluoromethyl group.

The monomer having a fluorine-containing alicyclic structure in the present invention, is preferably a monomer selected from the compounds of the following general formulae (5) to (7):

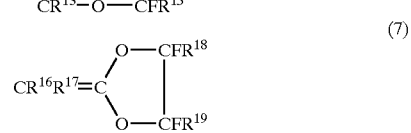

wherein each of $R^8$ to $R^{19}$ which are independent of one another, is a fluorine atom, a chlorine atom, a chlorodifluoroethyl group, a trifluoromethyl group or a $C_{1-3}$ perfluoroalkoxy group, or $R^{10}$ and $R^{11}$, $R^{14}$ and $R^{15}$, or $R^{18}$ and $R^{19}$, are linked with each other to form a ring.

Specific examples of the compound represented by any one of the general formulae (5) to (7) include the following compounds of the formulae (8) to (16):

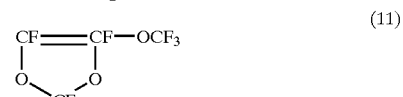

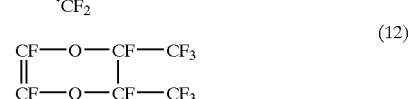

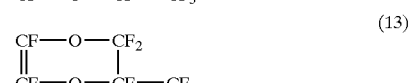

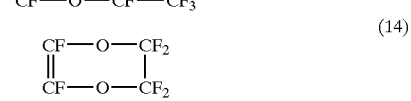

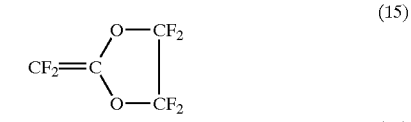

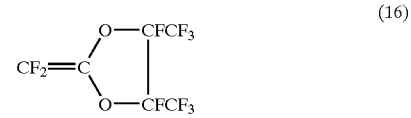

The fluorine-containing monomer having at least two polymerizable double bonds, is preferably the compound represented by any one of the following general formulae (17) to (19):

$$CY^1Y^2=CY^3OCY^4Y^5CY^6Y^7CY^8=CY^9Y^{10} \quad (17)$$

$$CZ^1Z^2=CZ^3OCZ^4Z^5CZ^6=CZ^7Z^8 \quad (18)$$

$$CW^1W^2=CW^3OCW^4W^5OCW^6=CW^7W^8 \quad (19)$$

wherein each of $Y^1$ to $Y^{10}$, $Z^1$ to $Z^8$ and $W^1$ to $W^8$, which are independent of one another, is a fluorine atom, a chlorine atom, a chlorodifluoromethyl group or a trifluoromethyl group.

Specific examples of the compound represented by any one of the general formulae (17) to (19) include the following compounds:
$CF_2=CFOCCl_2CF_2CF=CF_2$.
$CF_2=CFOCF_2CF_2CCl=CF_2$.
$CF_2=CFOCF_2CF_2CF=CF_2$.
$CF_2=CFOCF_2CFClCF=CF_2$.
$CF_2=CFOCF_2CF_2CF=CFCl$.
$CF_2=CFOCF_2CF(CF_3) \; CF=CF_2$.
$CF_2=CFOCF_2CF(CF_3) \; CCl=CF_2$.
$CF_2=CFOCF_2CF=CF_2$.
$CF_2=CFOCF(CF_3) \; CF=CF_2$.
$CF_2=CFOCF_2OCF=CF_2$.
$CF_2=CClOCF_2OCCl=CF_2$.
$CF_2=CFOCCl_2OCF=CF_2$.
$CF_2=CFOC(CF_3)_2OCF=CF_2$.

The functional groups in the functional group-containing fluoropolymer in the present invention are not particularly limited. They may, for example, be carboxylic acid groups, sulfonic acid groups, groups having an ester linkage, alkenyl groups, hydrolizable silyl groups, hydroxyl groups, maleimide groups, amino groups, cyano groups or isocyanate groups. Carboxylic acid groups are particularly preferred as the functional groups, since good adhesion to the substrate such as a silicon substrate can be obtained, and transparency is not inhibited.

The amount of the functional groups in the functional group-containing fluoropolymer is preferably from 0.001 to 1 mmol, more preferably from 0.01 to 1 mmol, still more preferably from 0.01 to 0.2 mmol, per 1 g of the functional group-containing fluoropolymer. A fluoropolymer having no functional group may be used together with the functional group-containing fluoropolymer.

As a method to produce a fluoropolymer having the above-mentioned functional groups, a method to produce a fluoropolymer and to introduce functional groups to the fluoropolymer, or a method to produce a fluoropolymer having functional groups by polymerization of a monomer capable of forming the above-mentioned fluoropolymer in the presence of a compound reactive with the monomer and containing functional groups, may, for example, be mentioned. It is also possible to produce a desired functional group-containing fluoropolymer by producing a fluoropolymer having groups to be converted to functional groups (hereinafter referred to as precursor functional groups) instead of functional groups, and by converting the precursor functional groups to functional groups. The precursor functional groups may, for example, be alkoxycarbonyl groups, which are converted to carboxylic acid groups by hydrolysis.

The preferred methods for producing a functional group-containing fluoropolymer are as follows.

(1) A method to produce a fluoropolymer having functional groups or precursor functional groups, by polymerization of a monomer capable of forming a fluoropolymer, in the presence of a chain transfer agent or a polymerization initiator, which has functional groups or precursor functional groups. The precursor functional groups in the precursor functional group-containing fluoropolymer, are converted to functional groups. For example, by using a chain transfer agent or a polymerization initiator, which has e.g. carboxylic acid groups, sulfonic acid groups or alkoxycarbonyl groups, a fluoropolymer having such groups can be produced. A fluoropolymer having alkoxycarbonyl groups can be converted to a fluoropolymer having carboxylic acid groups by hydrolysis.

(2) A method to produce a fluorinated alicyclic structure-containing polymer having functional groups or precursor functional groups, by subjecting the polymer having a fluorine-containing alicyclic structure to high-temperature treatment in the presence of oxygen for oxidative destruction of the side chains or the terminals of the polymer. It is considered that fluorocarbonyl groups are formed by oxidative destruction, and by reacting the fluoropolymer with water after the oxidative destruction, the fluoropolymer can be converted to a fluoropolymer having carboxylic acid groups. Further, by reacting the fluoropolymer with an alkanol after the oxidative destruction, the fluoropolymer can be converted to a fluoropolymer having alkoxycarbonyl groups, which can further be converted to a fluoropolymer having carboxylic acid groups by hydrolysis.

(3) A method to produce a fluoropolymer having functional groups or precursor functional groups, by copolymerization of a monomer capable of forming a fluoropolymer with a monomer having functional groups or precursor functional groups. The precursor functional groups in the precursor functional group-containing fluoropolymer are converted to functional groups. For example, a precursor carboxylic acid group-containing monomer such as methyl perfluoro(5-oxa-6-hexanoate) is copolymerized to produce a precursor functional group-containing fluoropolymer, which is then converted to carboxylic acid group-containing fluoropolymer by hydrolysis.

(4) A method to convert the functional groups in the functional group-containing fluoropolymer obtained by the above-mentioned methods (1) to (3), to other functional groups by known methods.

The material for the core in the optical waveguide of the present invention is preferably a material having a higher refractive index than the material for the clad, and it is preferably a mixture of a fluoropolymer with "a compound having a higher refractive index than the fluoropolymer" (hereinafter referred to as compound (2)).

The compound (2) may be any one selected from a low molecular weight compound, an oligomer and a polymer, so long as it does not substantially increase light scattering, and it can make the refractive index of the fluoropolymer containing the compound (2) high as compared with a fluoropolymer alone. The compound (2) is preferably a substance having a higher refractive index by at least 0.001 as compared with the fluoropolymer.

The low molecular weight compound may, for example, be a halogenated aromatic hydrocarbon which does not contain a hydrogen atom bonded to a carbon atom. Particularly, a halogenated aromatic hydrocarbon containing fluorine atoms alone as halogen atoms, and a halogenated aromatic hydrocarbon containing fluorine atoms and other halogen atoms, are particularly preferred in view of miscibility with the fluoropolymer.

Such a halogenated aromatic hydrocarbon may, for example, be a compound represented by the formula $\Phi-Z_b$ wherein Φ is a b-valent perfluoro aromatic ring residue, Z is a halogen atom other than a fluorine atom, —Rf, —CORf, —ORf or —CN, wherein Rf is a perfluoroalkyl group, a perhalo polyfluoroalkyl group or a monovalent Φ, and b is an integer of 0 or above. The aromatic ring may be a benzene ring or a naphthalene ring. The carbon number of the perfluoroalkyl group or the perhalo polyfluoroalkyl group as Rf is preferably at most 5. As the halogen atom other than a fluorine atom is preferably a chlorine atom or a bromine atom.

Specific examples of the compound include 1,3-dibromotetrafluorobenzene, 1,4-dibromotetrafluorobenzene, 2-bromotetrafluorobenzotrifluoride, chloropentafluorobenzene, bromopentafluorobenzene, iodopentafluorobenzene, decafluorobenzophenone, perfluoroacetophenone, perfluorobiphenyl, chloroheptafluoronaphthalene and bromoheptafluoronaphthalene.

The oligomer may, for example, be a homopolymerized oligomer of a fluorine-containing monomer such as tetrafluoroethylene, chlorotrifluoroethylene, dichlorodifluoroethylene, hexafluoropropylene or perfluoro (alkyl vinyl ether) and a copolymerized oligomer of at least two of such monomers. Further, e.g. a perfluoropolyether having a structural unit of e.g. —$CF_2CF(CF_3)O$— or —$(CF_2)_nO$— (n is an integer of from 1 to 3), may also be used.

As the compound (2), a compound of the general formula $R^a_m MR^b_{4-m}$ wherein $R^a$ is a $C_{1-4}$ non-hydrolizable organic group, provided that when m is 2 or 3, the plurality of $R^a$ may be the same or different, $R^b$ is a hydrolizable group, m is an integer of from 0 to 3, and M is Si, Ti, Zr, Hf or Th, or a partially hydrolyzed condensate thereof (hereinafter they are generically referred to as compound (a)), is preferred. One kind of the compound (a) may be used or at least two kinds of the compounds (a) may be used, as the compound (2).

The hydrolizable group may, for example, be an alkoxy group, an alkoxy alkoxy group, an acyloxy group, an aryloxy group, an aminoxy group, a carbamoyl group, a ketoxime group, an isocyanate group or a halogen atom. Preferred is a group having a hydrogen atom in the hydroxyl group of a monovalent alcohol removed such as an alkoxy group or an alkoxy alkoxy group. An alkoxy group is particularly preferred, and the carbon number is preferably at most 4, particularly preferably 1 or 2.

It is preferred that at least one of the non-hydrolizable organic groups $R^a$ in the compound (a) is an organic group containing a functional group. In the case where a non-hydrolizable organic group containing no functional group is present as $R^a$, the organic group is usually an alkyl group. The functional group may, for example, be an amino group, an epoxy group, a glycidoxy group, a mercapto group or an isocyanate group.

In the optical waveguide, the width of the core, the height of the core and the space between the adjacent cores are usually as small as from 0.1 μm to several tens μm, respectively. Accordingly, the compound (2) in the core may diffuse into the clad during the heat treatment for the preparation of the optical waveguide, whereby an adequate difference in refractive index between the core and the clad may not be obtained in some cases.

In such a case, for the mixture of the fluoropolymer with the compound (2), it is preferred to employ a functional group-containing fluoropolymer as the fluoropolymer, and one having a functional group reactive with the functional groups in the functional group-containing fluoropolymer as the compound (2), whereby the diffusion of the compound (2) due to heating can be suppressed. A fluoropolymer having no functional group may be used together with the functional group-containing fluoropolymer, and a compound (2) having no functional group reactive with the functional groups in the functional group-containing fluoropolymer, may be used together with the compound (2) having a functional group reactive with the functional groups in the functional group-containing fluoropolymer. Such a compound (2) may, for example, be the above-mentioned oligomer or halogenated aromatic hydrocarbon containing the above functional group.

The compound (2) having a functional group reactive with the functional groups in the functional group-containing fluoropolymer, is preferably at least one selected from the compounds (a), wherein m is from 1 to 3, and at least one $R^a$ contains a functional group reactive with the functional groups in the functional group-containing fluoropolymer, and partially hydrolyzed condensates thereof (hereinafter they will generically be referred to as compound (b)). It is more preferred to use the compound (b) together with the compound (a).

The preferred combination is such that functional groups in the functional group-containing fluoropolymer are carboxylic acid groups, and the functional group in the compound (b) is an amino group. In the case where the compound (a) is used together with the compound (b), the preferred combination is such that the compound (a) has at least three hydrolizable groups, and the compound (b) has two hydrolizable groups.

Both of the compound (a) and the compound (b) are preferably silane compounds, as the transparency is high. The compound (a) is preferably a tetraalkoxysilane, a monoalkyltrialkoxysilane, a fluoroalkylalkoxysilane, an aromatic ring-containing alkoxysilane or a partially hydrolyzed condensate of such compounds. The compound (b) is preferably an alkoxysilane compound having an amino group-containing non-hydrolizable organic group, an alkoxysilane compound having a glycidoxy group-containing non-hydrolizable organic group, or a partially hydrolyzed condensate of such compounds.

The preferred tetraalkoxysilane includes tetramethoxysilane, tetraethoxysilane and tetrapropoxysilane, the preferred monoalkyltrialkoxysilane includes methyltrimethoxysilane and methyltriethoxysilane, the preferred fluoroalkylalkoxysilane includes trifluoromethyltrimethoxysilane, trifluoropropyltrimethoxysilane, pentafluorobutyltrimethoxysilane, nonafluorohexyltrimethoxysilane, tridecafluorooctyltrimethoxysilane, heptadecafluorodecyltrimethoxysilane, heptadecafluorodecylmethyldimethoxysilane and heptadecafluoroundecyltrimethoxysilane, and the preferred aromatic ring-containing alkoxysilane includes phenyltrimethoxysilane.

The alkoxysilane compound having an amino group-containing non-hydrolizable organic group, is preferably an aminoalkylalkoxysilane such as 3-aminopropylmethyldiethoxysilane or 3-aminopropyltriethoxysilane, or an aminoarylalkoxysilane such as aminophenyltrimethoxysilane, aminophenyltriethoxysilane or N-phenyl-3-aminopropyltrimethoxysilane.

The alkoxysilane compound having a glycidoxy group-containing non-hydrolizable organic group is preferably a glycidoxyalkylalkoxysilane such as 3-glycidoxypropyltrimethoxysilane or 3-glycidoxypropylmethyldimethoxysilane.

The ratio of the compound (a), the compound (b) or the total of the compounds (a) and (b) to the fluoropolymer, the functional group-containing fluoropolymer or the total of them, is such that the former is preferably from 1 to 100 parts by weight, more preferably from 5 to 50 parts by weight, based on 100 parts by weight of the latter.

As a method to form the core and the clad on the substrate, the clad is coated on the substrate, the core is coated thereon, a part of the core is subjected to etching, and the clad is coated on the core after etching. As the coating method, e.g. spin coating, dipping, potting, die coating or spray coating may be employed, and spin coating is particularly preferred.

For coating the core, in the case of the combination of the functional group-containing fluoropolymer with the compound (b), for example, it is preferred to use a solution having the mixture of them dissolved in a solvent. The method for preparing the solution is not particularly limited so long as an uniform solution can be obtained, and the following methods (I) to (III) are mentioned.

(I) A method wherein a solution of the compound (b) and a solution of the functional group-containing fluoropolymer are preliminarily prepared separately, and the solutions are mixed with each other. In such a case, as the method for preparing the solution of the compound (b), a method to directly prepare the solution in a solvent miscible with the solution of the functional group-containing fluoropolymer, or a method to prepare the solution in a solvent which is not miscible with the solution of the polymer, which is then converted to a solution miscible with the solution of the polymer by a known solvent substitution method, may be mentioned. The latter method is employed when the hydrolysis-condensation of the compound (b) does not adequately proceed, or when the polymerization degree of the partially hydrolyzed condensate can hardly be controlled, in a solvent miscible with the solution of the polymer.

(II) A method to dissolve the compound (b) which is not condensed in a preliminarily prepared solution of the functional group-containing fluoropolymer, followed by partial hydrolysis-condensation reaction of the compound (b) in the solution.

(III) A method to preliminarily prepare a solution of the compound (b), and to add the functional group-containing fluoropolymer thereto for dissolution.

A functional group-containing fluoropolymer resin and the compound (b) may be reacted with each other during the preparation of the solution, or during the coating layer forming process for the coating. It is preferred to react some of them during the preparation of the solution, as the miscibility of the compound (b) with the functional group-containing fluoropolymer resin tends to increase. The preparation of the solution may be conducted under heating to react them during the preparation of the solution.

The condensation reaction of the compound (a) or the compound (b) may be carried out by a known method. For example, a method to conduct hydrolysis-condensation reaction of the compound (a) or the compound (b) by adding water thereto in the presence of a solvent and a catalyst, may be mentioned. In such a case, the process is conducted under heating as the case requires. As the catalyst, an inorganic acid such as hydrochloric acid, nitric acid or sulfuric acid, or an organic acid such as formic acid, oxalic acid or acetic acid, may be used.

Usually, the partially hydrolyzed condensate has a weight average molecular weight calculated as polystylene of preferably ranging from 500 to 10,000, in view of the miscibility with the fluoropolymer or the functional group-containing fluoropolymer, and the solubility in the solvent. As the case requires, water present in the system may be removed by e.g. distillation, and the catalyst may be removed by e.g. an ion exchange resin.

As the solvent for preparation of the above-mentioned solution, a mixture of an aprotic fluorine-containing solvent with a protic fluorine-containing solvent is preferred.

The aprotic fluorine-containing solvent is a fluorine-containing solvent which does not dissociate into ions to produce protons under normal reaction conditions, and known solvents may be used. It may, for example, be a fluorine-containing aliphatic hydrocarbon such as perfluorodecalin, perfluorocyclohexane, perfluorohexane, perfluorooctane, 1H,1H,1H,2H,2H-perfluorooctane or 1H,1H,1H,2H,2H-perfluorodecane, a fluorine-containing alkylamine such as perfluorotripentylamine, perfluorotributylamine or perfluorotripropylamine, or a fluorine-containing cyclic ether such as perfluoro(2-butyltetrahydrofuran). They may be used in combination as a mixture of two or more of them.

The protic fluorine-containing solvent is a fluorine-containing solvent which is likely to dissociate into ions to produce protons, and known solvents may be used. A fluorine-containing alcohol such as $CF_3CH_2OH$, $F(CF_2)_2CH_2OH$, $F(CF_2)_4CH_2CH_2OH$, $F(CF_2)_6CH_2CH_2OH$, $F(CF_2)_2CH_2CH_2CH_2OH$ or $F(CF_2)_4CH_2CH_2CH_2OH$, may preferably be mentioned. They may be used in combination as a mixture of two or more of them.

In the case of using a solution or a dispersion having the mixture or the reaction product of the fluoropolymer with the compound (a) or the compound (b) dissolved or dispersed in a solvent, the solution or the dispersion is applied to the predetermined part, and the solvent is removed followed by heating to form the core. By the heating, the compound (a) or the compound (b) becomes a final hydrolyzed condensate. The hydrolyzed condensate may sometimes be bonded to the polymer having a fluorine-containing alicyclic structure. Particularly, in the case of using the functional group-containing fluoropolymer and the compound (b), it is considered that the core made of a material which is composed of the functional group-containing fluoropolymer and the hydrolyzed condensate of the compound (b), is formed.

In the optical waveguide of the present invention, by using a fluorinated alicyclic structure-containing polymer having functional groups as the clad material, the adhesion between the substrate and the clad material can be made high. Further, in the case of using the fluorinated alicyclic structure-containing polymer having functional groups as the core material, as the affinity with the clad material increases, the adhesion to the clad material can be made high, whereby irregularities at the interface between the clad and the core are hardly formed. Further, by using, as the core material, together with the fluorinated alicyclic structure-containing polymer having functional groups, a compound having a functional group reactive with the functional group, as a compound to increase the refractive index, the diffusion of the compound into the clad can be suppressed.

Various functional compounds can be blended with the clad or the core in the optical waveguide of the present invention, whereby various functions can be imparted to the waveguide. For example, a fluorescent emissive functional organic pigment such as a rhodamine type pigment having an optical amplification function may be blended therewith. It is preferred that such a functional compound is fixed in the clad material or the core material. A fluorinated alicyclic structure-containing polymer having the above-mentioned functional groups is effective for fixation of such a functional compound. For example, as the rhodamine type pigment has an amino group, it can be bonded to a polymer having carboxylic acid groups, and be fixed thereto.

Now, the present invention will be described in further detail with reference examples. However, it should be understood that the present invention is by no means restricted to such specific examples.

EXAMPLE 1

Synthesis Example 35 g of perfluoro(butenyl vinyl ether), 150 g of deionized water, 20 g of methanol and 90 mg of $((CH_3)_2CHOCOO)_2$ as a polymerization initiator were put in a pressure glass autoclave with an internal volume of 200 cc, the atmosphere in the autoclave was replaced by nitrogen three times, and suspension polymerization was conducted for 22 hours at 40° C., yielding 28 g of a polymer (hereinafter referred to as polymer A).

The polymer A had an intrinsic viscosity [η] of 0.2 dl/g in perfluoro(2-butyltetrahydrofuran) at 30° C. The polymer A was subjected to heat treatment in air at 300° C. for 3 hours, and was immersed in water, to obtain a polymer (hereinafter referred to as polymer B). In IR spectrum of the polymer B, a peak attributable to carboxylic acid groups was confirmed, and the amount of the carboxylic acid groups were 0.03 mmol/g polymer B. The transmittance of polymer B was as high as 95% or above.

EXAMPLE 2

Synthesis Example 40 g of perfluoro(butenyl vinyl ether), 1.6 g of methyl perfluoro(5-oxa-6-heptenoate), 150 g of deionized water, and 90 mg of $((CH_3)_2CHOCOO)_2$ as a polymerization initiator were put in a pressure glass autoclave with an internal volume of 200 cc, the atmosphere in the autoclave was replaced by nitrogen three times, and suspension polymerization was conducted for 24 hours at 40° C., to obtain 30 g of a polymer (hereinafter referred to as polymer C).

The polymer C had an intrinsic viscosity [η] of 0.34 dl/g in perfluoro(2-butyltetrahydrofuran) at 30° C. The polymer C was subjected to heat treatment in air at 300° C. for 3 hours, and was immersed in water, to obtain a polymer (hereinafter referred to as polymer D). In IR spectrum of the polymer D, a peak attributable to carboxylic acid groups was confirmed, and the amount of the carboxylic acid groups were 0.03 mmol/g polymer D.

EXAMPLE 3

Synthesis Example

The polymer B was immersed in dichloropentafluoropropane/1-propanol in the presence of sodium borohydride, and refluxed for 5 hours, followed by washing and drying, to obtain a polymer (hereinafter referred to as polymer E). In the IR spectrum of the polymer E, the peak attributable to hydroxyl groups was confirmed.

EXAMPLE 4

Working Example 10 g of the polymer B was dissolved in 90 g of perfluorotributylamine, to prepare a solution of a polymer B (hereinafter referred to as B1 solution). The composition comprising 10 g of the polymer A, 70 g of perfluorotributylamine, 15 g of 1H,1H-pentafluoropropanol, 0.05 g of 3-aminopropylmethyldiethoxysilane and 1.0 g of tetramethoxysilane (hereinafter referred to as A1 solution) was prepared.

The B1 solution was coated on a silicon substrate by spin coating, followed by heating for 60 minutes at 250° C. to form a clad (lower clad) having a thickness of 10 μm, and a B1 solution-coated substrate was obtained. The B1 solution-coated substrate was pressurized and heated by a pressure cooker testing machine, and cross-cut adhesion test was conducted in accordance with a method as defined in JIS K5400, 6.14. The remain after 100 hours was 100/100.

A1 solution was coated on the remaining B1 solution-coated substrate after the cross-cut adhesion test by spin coating, followed by heating for 60 minutes at 250° C., to form a core of 5 μm. Then, resist coating, pre-baking, exposure, development and after baking are carried out to obtain a resist layer having patterning applied thereto. The core which was not protected by the resist layer was removed by dry etching. The remaining resist was removed by wet etching, and a clad (upper clad) was formed thereon by using B1 solution in the same manner as in forming the above-mentioned lower clad, to obtain an optical waveguide.

In the optical waveguide, the clad and the core had refractive indices of 1.340 and 1.345, respectively. The transmission loss of the optical waveguide was measured by using a light source from a laser diode. As a result, it was at most 0.1 dB/cm at wavelength of 650 nm, 0.11 dB/cm at wavelength of 1,300 nm, and 0.17 dB/cm at wavelength of 1,550 nm. Accordingly, the optical waveguide could excellently transmit light ranging from visible light to ultra violet light.

EXAMPLE 5

Working Example

A composition comprising 10 g of the polymer D, 70 g of perfluorotributylamine, 15 g of 1H,1H-pentafluoropropanol, 0.15 g of 3-aminopropylmethyldiethoxysilane and 3.0 g of tetramethoxysilane (hereinafter referred to as D1 solution) was prepared.

An optical waveguide was obtained in the same manner as in Example 4, except that D1 solution was used instead of A1 solution. Of the optical waveguide, the clad and the core had refractive indices of 1.340 and 1.348, respectively. The transmission loss of the optical waveguide was measured by using a light source from a laser diode. As a result, it was at most 0.1 dB/cm at wavelength of 650 nm, 0.10 dB/cm at wavelength of 1,300 nm, and 0.17 dB/cm at wavelength of 1,550 nm. Accordingly, the optical waveguide could excellently transmit lights ranging from visible light to ultraviolet light.

EXAMPLE 6

Working Example

Phenyltrimethoxysilane and $CF_3(CF_2)_5CH_2CH_2Si(OCH_3)_3$ with a molar ratio of 1:1 were dissolved in methanol in a reactor, and nitric acid and water were added thereto, to carry out the reaction for 72 hours at room temperature. The reaction solution was made to pass through an ion exchange resin tower to remove nitric acid therefrom, and the solvent was substituted to 1H,1H-pentafluoropropanol, to obtain a solution of a partially hydrolyzed condensate. A composition comprising 5 g of the solution having a solid concentration of 60 wt %, 10 g of the polymer B, 85 g of perfluorotributylamine and 0.05 g of 3-aminopropylmethyldiethoxysilane (hereinafter referred to as B3 solution) was prepared.

An optical waveguide was obtained in the same manner as in Example 4, except that B3 solution was used instead of A1 solution. Of the optical waveguide, the clad and the core had refractive indices of 1.340 and 1.352, respectively. The transmission loss of the optical waveguide was measured by using a light source from a laser diode. As a result, it was at most 0.1 dB/cm at wavelength of 650 nm, 0.10 dB/cm at wavelength of 1,300 nm, and 0.15 dB/cm at wavelength of 1,550 nm. Accordingly, the optical waveguide could excellently transmit lights ranging from visible light to ultraviolet light.

EXAMPLE 7

Working Example

A composition comprising 10 g of the polymer D, 70 g of perfluorotributylamine, 15 g of 1H,1H-pentafluoropropanol and 3.0 g of 3-aminopropylmethyldiethoxysilane (hereinafter referred to as D3 solution) was prepared.

An optical waveguide was obtained in the same manner as in Example 4, except that D3 solution was used instead of A1 solution. Of the optical waveguide, the clad and the core had refractive indices of 1.340 and 1.346, respectively. The transmission loss of the optical waveguide was measured by using a light source from a laser diode. As a result, it was at most 0.1 dB/cm at wavelength of 650 nm, 0.10 dB/cm at wavelength of 1,300 nm, and 0.18 dB/cm at wavelength of 1,550 nm. Accordingly, the optical waveguide could excellently transmit lights ranging from visible light to ultraviolet light.

EXAMPLE 8

Working Example

A composition comprising 18 g of the polymer E, 180 g of perfluorotributylamine and 2 g of a carboxylic acid group-terminated chlorotrifluoroethylene oligomer (hereinafter referred to as E1 solution) was prepared.

An optical waveguide was obtained in the same manner as in Example 4, except that E1 solution was used instead of A1 solution. Of the optical waveguide, the clad and the core had refractive indices of 1.340 and 1.354, respectively. The transmission loss of the optical waveguide was measured by using a light source from a laser diode. As a result, it was at most 0.1 dB/cm at wavelength of 650 nm, 0.11 dB/cm at wavelength of 1,300 nm, and 0.20 dB/cm at wavelength of 1,550 nm. Accordingly, the optical waveguide could excellently transmit lights ranging from visible lights to ultraviolet light.

EXAMPLE 9

Comparative Example 10 g of the polymer A was dissolved in 90 g of perfluorotributylamine, to prepare a solution of the polymer A (hereinafter referred to as A2 solution). A1 solution was coated on a silicon substrate by spin coating, followed by heating for 60 minutes at 250° C., to form a thin layer having thickness of 10 $\mu$m. The thin layer was pressurized and heated by a pressure cooker testing machine, and cross-cut adhesion test was conducted in accordance with a method as defined in JIS K5400, 6.14. As a result, the remaining after 100 hours was 0/100.

EXAMPLE 10

Working Example 61 g (0.2 mol) of methyl perfluoro(5-oxa-6-heptenoate) (hereinafter referred to as MPOH, constitutional formula; $CF_2$=$CFOCF_2CF_2CF_2COOCH_3$) and 17 g of a 5 wt % solution (solvent: 225 cb) of perfluorobutanoylperoxide (hereinafter referred to as PBPO) (0.002 mol as PBPO) were added to an autoclave having an internal volume of 100 cc, followed by cooling by liquid nitrogen for deaeration, and the reaction was carried out for 5 hours at 40° C. Low-boiling contents were removed from the reaction solution under reduced pressure followed by vacuum drying, and 7.9 g of homopolymer (heptamer) of MPOH was obtained.

The —$COOCH_3$ group was reacted with ammonia and converted to a carbamoyl group, which was then reacted with trifluoroacetate anhydride/pyridine and converted to a cyano group. 5 g of the homopolymer was dissolved in 5 g of propanol pentafluoride and 0.15 g of 2-ethylhexylamine followed by adequately stirring, which was then subjected to filtration by a 0.5$\mu$ PTFE filter to obtain E1 solution.

An optical waveguide was obtained in the same manner as in Example 4, except that E2 solution was used instead of A1 solution. Of the optical waveguide, the clad and the core had refractive indices of 1.340 and 1.385, respectively. The transmission loss of the optical waveguide was measured by using a light source from a laser diode. As a result, it was at most 0.35 dB/cm at wavelength of 650 nm, 0.45 dB/cm at wavelength of 1,300 nm, and 0.50 dB/cm at wavelength of 1,550 nm. Accordingly, the optical waveguide could excellently transmit lights ranging from visible light to ultraviolet light.

EXAMPLE 11

Working Example 30 g (0.1 mol) of MPOH, 26.6 g (0.1 mol) of perfluoro (propyl vinyl ether) (hereinafter referred to as PPVE, constitutional formula; $CF_2$=$CFOCF_2CF_2CF_3$) and 17 g of a 5 wt % solution (solvent: 225 cb) of PBPO (0.002 mol as PBPO) were added to an autoclave having an internal volume of 100 cc, followed by cooling by liquid nitrogen for deaeration, and the reaction was carried out for 5 hours at 40° C. Low-boiling contents were removed from the reaction solution under reduced pressure followed by vacuum drying, and 7 g of a copolymer (heptamer) of MPOH and PPVE was obtained.

The —$COOCH_3$ group was reacted with ammonia and converted to a carbamoyl group, which was then reacted with trifluoroacetate anhydride/pyridine and converted to a cyano group. 5 g of the homopolymer was dissolved in 5 g of propanol pentafluoride and 0.15 g of 2-ethylhexylamine followed by adequately stirring, which was then subjected to filtration by a 0.5$\mu$ PTFE filter to obtain E2 solution.

An optical waveguide was obtained in the same manner as in Example 4, except that E2 solution was used instead of A1 solution. Of the optical waveguide, the clad and the core had refractive indices of 1.340 and 1.360, respectively. The transmission loss of the optical waveguide was measured by using a light source from a laser diode. As a result, it was at most 0.30 dB/cm at wavelength of 650 nm, 0.40 dB/cm at wavelength of 1,300 nm, and 0.45 dB/cm at wavelength of 1,550 nm. Accordingly, the optical waveguide could excellently transmit lights ranging from visible light to ultraviolet light.

Effect of the Invention

The optical waveguide of the present invention can transmit lights ranging from ultraviolet light to near infrared rays with an extremely low transmission loss, and has an extremely strong adhesion to the substrate. In the heat treatment for preparing the optical waveguide, diffusion of the compound (2) in the core to the clad can be suppressed, hereby an adequate difference in refractive index between the core and the clad can be secured.

What is claimed is:

1. An optical waveguide provided on a substrate, comprising:

a core for transmitting light; and a clad formed around the core;

wherein the clad comprises a fluorinated alicyclic structure containing polymer having a functional group; and wherein the core comprises a second polymer which is different from the fluorinated alicyclic structure-containing polymer of the clad;

wherein said fluorinated alicyclic structure containing polymer is a perhalo compound having at least one of the following polymer units of formulae (1) to (4):

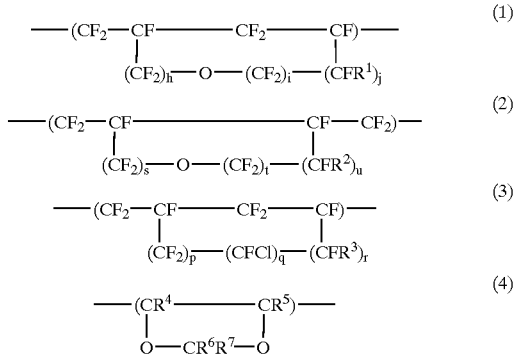

wherein h is an integer of from 0 to 5, i is an integer of from 0 to 4, j is 0 or 1, h+i+j is from 1 to 6, s is an integer of from 0 to 5, t is an integer of from 0 to 4, u is 0 or 1, s+t+u is from 1 to 6, each of p, q and r which are independent of one another, is an integer of from 0 to 5, p+q+r is from 1 to 6, and each of $R^1$ to $R^7$ which are independent of one another, is a fluorine atom, a chlorine atom, a chlorodifluoromethyl group or a trifluoromethyl group.

2. The optical waveguide according to claim 1, wherein the substrate is a semiconducting substrate.

3. The optical waveguide according to claim 1, wherein the said second polymer has a higher refractive index than the polymer of the clad.

4. The optical waveguide according to claim 1, wherein said fluorinated alicyclic structure containing polymer comprises a fluorinated alicyclic structure in an amount of at least 20 mol % based on the total number polymer units of the polymer.

5. The optical waveguide according to claim 1, wherein said fluorinated alicyclic structure containing polymer comprises a fluorinated alicyclic structure in an amount of at least 40 mol % based on the total number polymer units of the polymer.

6. The optical waveguide according to claim 1, wherein said functional group of said fluorinated alicyclic structure containing polymer is selected from the group consisting of a carboxylic acid group, a sulfonic acid group, a group having an ester linkage, an alkenyl group, a hydrolizable silyl group, a hydroxyl group, a maleimide group, an amino group, a cyano group and an isocyanate group.

7. The optical waveguide according to claim 1, wherein an amount of functional groups in said fluorinated alicyclic structure containing polymer is from 0.001 to 1 mmol.

8. The optical waveguide according to claim 1, wherein a refractive index of said second polymer is at least 0.001 higher than a refractive index of said fluorinated alicyclic structure containing polymer.

9. The optical waveguide according to claim 1, wherein said core comprises a crosslinked product of a crosslinkable fluorine containing compound.

10. The optical waveguide according to claim 1, wherein said core comprises a fluorine containing polymer obtained by crosslinking a perfluoro compound having at least two cyano groups.

11. The optical waveguide according to claim 10, wherein said crosslinking occurs by trimerization of the cyano groups, thereby forming a s-triazine ring from three cyano groups.

12. The optical waveguide according to claim 11, wherein the refractive index can be changed by controlling an amount of s-triazine rings.

13. The optical waveguide according to claim 1, wherein the core comprises a material comprising a mixture of a polymer having a fluorine containing alicyclic structure with a compound having a higher refractive index than said polymer; and which has a higher refractive index than the polymer of the clad.

14. The optical waveguide according to claim 13, wherein said compound is selected from the group consisting of a low molecular weight compound, an oligomer or a polymer, provided that the compound does not increase the light scattering of the fluorine containing alicyclic structure containing polymer and increases the refractive index of the fluorine-containing alicyclic structure containing polymer.

15. The optical waveguide according to claim 14, wherein said low molecular weight compound is a halogenated aromatic hydrocarbon.

16. The optical waveguide according to claim 13, wherein said compound is a compound of the general formula $$R^a{}_m MR^b{}_{4-m}$$

wherein $R^a$ is a $C_{1-14}$ non-hydrolizable organic group, provided that when m is 2 to 3, the plurality of $R^a$ may be the same or different;

$R^b$ is a hydrolizable group;

m is an integer of from 0 to 3; and

M is Si, Ti, Zr, Hf or Th.

17. The optical waveguide according to claim 16, wherein said hydrolyzable group is selected from the group consisting of an alkoxy group, an alkoxy group, an acyloxy group, an aryloxy group, an aminoxy group, a carbamoyl group, a ketoxime group, an isocyanate group and a halogen.

18. The optical waveguide according to claim 16, wherein said compound has a functional group reactive with the functional group of the fluorinated alicyclic structure containing polymer.

19. The optical waveguide according to claim 1, wherein the core comprises a material which is composed of a mixture or a reaction product of a fluorinated alicyclic structure-containing polymer having a functional group with a compound containing a functional group reactive with the functional group in said fluorinated alicyclic structure containing polymer, and which has a higher refractive index than the polymer of the clad.

20. An optical waveguide provided on a substrate, comprising:
   a core for transmitting light; and
   a clad formed around the core;
   wherein the clad comprises a fluorinated alicyclic structure containing polymer having a functional group; and
   wherein the core comprises a material comprising a mixture of a polymer having a fluorine containing alicyclic structure with a compound having a higher refractive index than said polymer; and which has a higher refractive index than the polymer of the clad.

21. An optical waveguide provided on a substrate, comprising:
   a core for transmitting light; and
   a clad formed around the core;
   wherein the clad comprises a fluorinated alicyclic structure containing polymer having a functional group; and
   wherein the core comprises a material which is composed of a mixture or a reaction product of a fluorinated alicyclic structure-containing polymer having a functional group with a compound containing a functional group reactive with the functional group in said fluorinated alicyclic structure containing polymer, and which has a higher refractive index than the polymer of the clad.

22. An optical waveguide provided on a substrate, comprising:
   a core for transmitting light; and
   a clad formed around the core;
   wherein the clad comprises a fluorinated alicyclic structure containing polymer having a functional group; and
   wherein the core comprises an amorphous fluorine-containing polymer.

23. The optical waveguide according to claim 1, wherein said clad, said core or both further comprise a fluorescent emissive functional organic pigment.

24. The optical waveguide according to claim 23, wherein said fluorescent emissive functional organic pigment is a rhodamine pigment.

25. An optical waveguide provided on a substrate, comprising:
   a core for transmitting light; and
   a clad formed around the core;
   wherein the clad consists essentially of a fluorinated alicyclic structure containing polymer having a functional group; and
   wherein the core consists essentially of a second polymer which is different from the fluorinated alicyclic structure-containing polymer of the clad;
   wherein said fluorinated alicyclic structure containing polymer is a perhalo compound having at least one of the following polymer units of formulae (1) to (4):

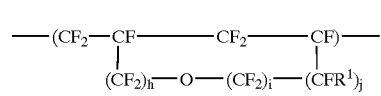 (1)

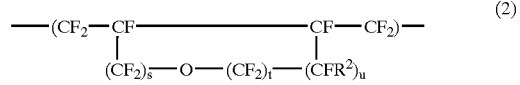 (2)

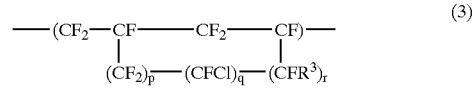 (3)

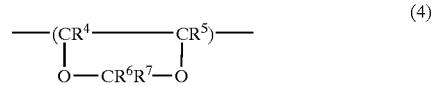 (4)

wherein h is an integer of from 0 to 5, i is an integer of from 0 to 4, j is 0 or 1, h+i+j is from 1 to 6, s is an integer of from 0 to 5, t is an integer of from 0 to 4, u is 0 or 1, s+t+u is from 1 to 6, each of p, q and r which are independent of one another, is an integer of from 0 to 5, p+q+r is from 1 to 6, and each of $R^1$ to $R^7$ which are independent of one another, is a fluorine atom, a chlorine atom, a chlorodifluoromethyl group or a trifluoromethyl group.

26. An optical waveguide provided on a substrate, comprising:
   a core for transmitting light; and
   a clad formed around the core;
   wherein the clad consists essentially of a fluorinated alicyclic structure containing polymer having a functional group; and
   wherein the core consists essentially of a material comprising a mixture of a polymer having a fluorine containing alicyclic structure with a compound having a higher refractive index than said polymer; and which has a higher refractive index than the polymer of the clad.

27. An optical waveguide provided on a substrate, comprising:
   a core for transmitting light; and
   a clad formed around the core;
   wherein the clad consists essentially of a fluorinated alicyclic structure containing polymer having a functional group; and
   wherein the core consists essentially of a material which is composed of a mixture or a reaction product of a fluorinated alicyclic structure-containing polymer having a functional group with a compound containing a functional group reactive with the functional group in said fluorinated alicyclic structure containing polymer, and which has a higher refractive index than the polymer of the clad.

28. An optical waveguide provided on a substrate, comprising:
   a core for transmitting light; and
   a clad formed around the core;
   wherein the clad consists essentially of a fluorinated alicyclic structure containing polymer having a functional group; and
   wherein the core consists essentially of an amorphous fluorine-containing polymer.

* * * * *